Patented Apr. 16, 1935

1,998,141

UNITED STATES PATENT OFFICE 1,998,141

METHOD FOR THE TREATMENT OF MILK

Erik Lundstedt, Ridgefield, N. J., assignor to Pfister Chemical Co. Inc., Ridgefield, N. J., a corporation of New Jersey No Drawing. Application August 8, 1933, Serial No. 684,177

5 Claims. (Cl. 99—11)

The invention relates to a method for the treatment of milk.

More particularly, it relates to a procedure for the treatment of milk whereby the curd character is modified and includes correlated improvements and discoveries which lead to an enhancement of the coagulability of the curd.

It has been recognized for some time that the character of the curd of milk is of marked importance with respect to its digestibility. A method has been devised whereby the curd tension of a milk may be accurately determined. The instrument used is known as a curd-o-meter and was developed by Dr. R. L. Hill at the Utah Experimental Station. Also, it is known that the human stomach in normal condition and without a food content is neutral. When food is eaten, the glands in the stomach wall secrete fluids containing hydrochloric acid. The acidity in the adult stomach is greater than that in infants. The difference is about pH5 for infants, to pH1 for adults. It follows therefrom that the character of the curd, namely its fineness and firmness, is of particular importance when milk curdles in the infant stomach. The assimilation of the milk is limited by the amount that the stomach can hold, but the ease with which the protein content is digested depends upon the softness of the coagulated protein materials, that is, the curd.

If a milk gives a soft curd, it can be readily digested, whereas, if the curd is hard and firm, the digestibility will be decreased and there will result therefrom the usual disorders, as vomiting, colic, etc. Research has shown that dilution retards digestion, but this does not effect any change in the character of the curd produced. The curd tension of milk from different cows and from various breeds differs. Thus, it has been found that the milk from Holsteins has an average curd tension of about 53 measured by the Hill curd-o-meter; Guernseys a curd tension of 63; and Jerseys a curd tension of 69. The curd tension may be reduced by about 30% by boiling the milk. This, however, frequently leads to disorders even more undesirable than the hard curd. A small percentage of cows give normally a milk which has a soft curd; that is, a curd having a tension of less than about 33 grams by the curd-o-meter.

The obtainment of a soft curd, therefore, entails a determination and selection of certain cows. These cows could be assembled into a herd, but the expense attending would materially increase the cost of production of soft curd milk. The production of a soft curd milk not only for infant but also for adult feeding in an economical manner, has been much sought for, but up to the present, it has not been possible to modify the usual marketable milk in a manner to give a soft curd without changing the usual characteristics of the milk and, in many respects, making it undesirable for feeding purposes.

It is an object of this invention to provide a method whereby average, mixed, whole milk may be treated in a manner such that the hardness of the curd is materially reduced without impairment of the flavor, appearance or composition thereof.

Another object of the invention is to provide a procedure whereby average, mixed, whole milk is subjected to a vigorous agitation at a low temperature, which produces a milk having a soft curd.

A further object of the invention is to provide a method for producing a soft curd milk from average, mixed, whole milk, which may be readily, effectively and economically utilized by the dairymen in a practical manner on a commercial scale.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention, a milk having a soft curd or a low curd tension may be produced by subjecting milk, particularly average, mixed, whole milk to agitation at a low temperature without freezing and for a suitable period of time which may be for example from about 10 minutes to from one to two hours, depending upon the character of the agitation, until the resulting milk has a reduced curd tension, or expressed otherwise, is characterized by a soft curd. The agitation of the milk should desirably be rather vigorous and may be occasioned by stirring, whipping, or shaking in a suitable apparatus, as a churn, Hobart mixer, etc. The temperature of the milk should be less than usual room temperature, and is desirably less than about 15° C., and preferably from zero to 5° C., but above the freezing point of the milk. The production of the soft curd milk is accomplished by cooling the milk to a low temperature, and while maintained at this temperature, agitating as in a standard churn for a period such that the curd of the milk will then be characterized by softness.

As an illustrative embodiment of the manner in which the invention may be practiced commercially, the following examples are presented:

Example I

Raw, average, mixed, whole milk is cooled to a temperature of about 0° C. This cooling may be brought about in any desired manner, as placing in a refrigerating mixture or in a tank cooled by circulating brine. The thus cooled milk is then placed into an agitating apparatus, as a standard type of churn, and the churn is filled to about 60% of its volume. The agitating or churning is then commenced and continued for a period of about one hour and a half.

Actual operations have shown that a milk having a curd tension of 60 grams and treated in the foregoing manner has resulted in a milk in which the curd tension has been reduced by over 60%. Especially, the tension was reduced to about 23 grams measured by the Hill curd-o-meter without any differences between the treated and untreated milk.

Example II

Raw, average, mixed, whole milk may be cooled in the manner stated in Example I to a temperature of about 2° C. The thus cooled milk is then introduced into a Hobart mixer and subjected to a high speed whipping for about 45 minutes. The curd tension was found to have been reduced by about 75%, or to a tension of about 15 grams, the same batch of milk having been used as was used in Example I.

The foregoing treatment was found to occasion also the separation of a small amount of the fat producing, as is known in the art, a slight feathering. The cold, agitated milk was subsequently subjected to homogenization at a low pressure, whereby the normal character of the milk was wholly restored. Following homogenization, if desired, the treated milk may be pasteurized, cooled, and bottled.

According to the foregoing procedure, a milk is obtained from average, mixed, whole milk in which the coagulability of the protein has been changed so as to produce a soft curd upon curdling and without any impairment of flavor, taste, appearance, chemical composition, salt balance, or vitamin content. It will be realized that the times, temperatures, type of agitation, etc., set forth in the foregoing examples may be varied somewhat without departing from the spirit and scope of the invention. Broadly, the invention pertains to the production of a soft curd milk by treating average, mixed, whole milk at a low temperature with vigorous agitation. The treatment in the event of feathering may be followed with a low pressure homogenization and the product finally pasteurized, cooled and bottled when it is ready for placement upon the market. The milk so produced is specially efficacious for the feeding of infants and adults, and by its use there is supplied a soft curd milk at a reasonable cost and with an obviation of the necessity of preparing the milk according to a formula. The milk produced may be used directly from the bottle without any subsequent treatment. A curd tension of 30 grams or less is considered by dairymen and boards of health as low. For example, the New York City Board of Health specifies a maximum limit of 33 grams for soft curd milk. The curd tension expressed in grams is, as above indicated, measured by the Hill curd-o-meter. The average curd tension of marketed milk is between 50 and 70 grams.

The foregoing procedure, therefore, enables the dairymen to market a soft curd milk without the trouble and expense entailed in the selection and segregation of certain cows in the herd. It has been found that the soft curd milk produced in accordance with this invention requires no modification for infant feeding other than perhaps the addition of usual carbohydrates. Infants which have had difficulty in digesting ordinary milk and more or less complex modifications thereof, and have shown no gain in weight and have been troubled with vomiting, have almost without exception ceased vomiting and have gained markedly in weight. The invention, accordingly, provides a procedure whereby the curd tension of milk may be reduced to that recognized and specified as a soft curd, in a manner which is readily practiced and without materially increasing the cost thereof, so that it is within the means of the average milk consumer.

It is not known with definiteness as to the manner in which the method hereinbefore described effects the reduction in curd tension. It is believed that the fat globules in the milk are surrounded by a membranous layer. This layer consists of substances which depress the surface tension of the milk and is made up partly of the lecithin content thereof. During the mechanical agitation at a low temperature, the lecithin is separated from the fat globules and unites or becomes associated with the protein, whereby the cohesion of the protein complex is lowered and the ability to form a solid coagulum or hard curd is destroyed. There results, therefore, a curd in which the compacting of the protein particles is prevented and this characterizes the soft curd.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method for the preparation of a soft curd milk which comprises cooling average, mixed, whole milk to a temperature of less than 15° C. but above the freezing point of the milk and subjecting the thus cooled milk to vigorous agitation with maintenance of flavor, appearance and composition.

2. A method for the preparation of a soft curd milk which comprises cooling average, mixed, whole milk to a temperature of less than 15° C. but above the freezing point of the milk subjecting the thus cooled milk to vigorous agitation, and subsequently homogenizing the thus treated milk with maintenance of flavor, appearance and composition.

3. A method for the preparation of a soft curd milk which comprises cooling average, mixed, whole milk to a temperature of about 0° C., without freezing and subjecting the thus cooled milk to vigorous agitation for a period of about ten minutes to one and one-half hours with maintenance of flavor, appearance and composition.

4. A method for the preparation of a soft curd milk which comprises cooling average, mixed, whole milk to a temperature of from 0 to 5° C., and subjecting the thus cooled milk to agitation in a churn while maintaining the temperature at less than 5° C., without freezing for a period of about ten minutes to one and one-half hours with maintenance of flavor, appearance and composition.

5. A method for the preparation of a soft curd milk which comprises cooling average, mixed, whole milk to a temperature of from 0 to 5° C., subjecting the thus cooled milk to agitation in a churn while maintaining the temperature at less than 5° C., without freezing for a period of about ten minutes to one and one-half hours with maintenance of flavor, appearance and composition, and subsequently homogenizing, pasteurizing, cooling and bottling the thus treated milk.

ERIK LUNDSTEDT.